(12) United States Patent
Mori et al.

(10) Patent No.: US 12,391,435 B2
(45) Date of Patent: Aug. 19, 2025

(54) LID, MOLD, AND LID MANUFACTURING METHOD

(71) Applicant: DAIWA CAN COMPANY, Tokyo (JP)

(72) Inventors: Masahiro Mori, Sagamihara (JP); Takashi Kanehira, Sagamihara (JP)

(73) Assignee: DAIWA CAN COMPANY, Tokyo (JP)

(*) Notice: Subject to any disclaimer, the term of this patent is extended or adjusted under 35 U.S.C. 154(b) by 28 days.

(21) Appl. No.: 17/730,366

(22) Filed: Apr. 27, 2022

(65) Prior Publication Data

US 2022/0281649 A1 Sep. 8, 2022

Related U.S. Application Data

(63) Continuation of application No. PCT/JP2020/041113, filed on Nov. 2, 2020.

(30) Foreign Application Priority Data

Nov. 5, 2019 (JP) .................... 2019-200910

(51) Int. Cl.
B65D 43/02 (2006.01)
B29C 51/10 (2006.01)
(Continued)

(52) U.S. Cl.
CPC .......... B65D 43/0208 (2013.01); B29C 51/10 (2013.01); B29C 51/20 (2013.01);
(Continued)

(58) Field of Classification Search
CPC .... B65D 2543/005; B65D 2543/00046; B65D 43/0208

See application file for complete search history.

(56) References Cited

U.S. PATENT DOCUMENTS 3,669,305 A * 6/1972 Kinney .............. B65D 21/0233
220/203.09
3,860,162 A * 1/1975 Schutz .............. B65D 47/2018
220/711
(Continued)

FOREIGN PATENT DOCUMENTS

JP  H11-147251 A  6/1999
JP  2000-043911 A  2/2000
(Continued)

OTHER PUBLICATIONS

International Search Report dated Jan. 19, 2021 received in PCT/JP2020/041113.
(Continued)

*Primary Examiner* — Jeffrey R Allen
(74) *Attorney, Agent, or Firm* — Scully, Scott, Murphy & Presser, P.C.

(57) ABSTRACT

According to an aspect, a lid includes a circular top portion, a fitting portion, and a skirt portion. The top portion has a drinking hole. The fitting portion includes an inner fitting portion protruding upwardly from a peripheral end of the top portion and adapted to contact a rim-side inner circumferential surface of a container body, and an upper fitting portion thicker than the inner fitting portion and adapted to be fitted onto a rim of the container body. An upper end of the fitting portion is at a level higher than the drinking hole. The skirt portion at its upper end is continuous with an outer-side lower end of the fitting portion. The skirt portion extends downwardly away from the rim. The skirt portion is adapted to cover a rim-side circumferential surface of the container body.

5 Claims, 14 Drawing Sheets

(51) Int. Cl.
   *B29C 51/20* (2006.01)
   *B29C 51/46* (2006.01)
   *B29L 31/56* (2006.01)
(52) U.S. Cl.
   CPC ......... *B29C 51/46* (2013.01); *B29L 2031/565* (2013.01); *B65D 2543/00046* (2013.01); *B65D 2543/00092* (2013.01); *B65D 2543/005* (2013.01); *B65D 2543/00537* (2013.01); *B65D 2543/00555* (2013.01); *B65D 2543/00638* (2013.01); *B65D 2543/00685* (2013.01); *B65D 2543/00759* (2013.01); *B65D 2543/00796* (2013.01)

(56) References Cited

U.S. PATENT DOCUMENTS

| | | | |
|---|---|---|---|
| 4,412,629 | A | 11/1983 | Dart et al. |
| 2011/0290817 | A1 | 12/2011 | Weiss et al. |
| 2014/0224822 | A1 | 8/2014 | Song |
| 2021/0237945 | A1* | 8/2021 | Tanaka ............... B65D 43/0218 |

FOREIGN PATENT DOCUMENTS

| | | | |
|---|---|---|---|
| JP | 2002-037306 | A | 2/2002 |
| JP | 2008-308225 | A | 12/2008 |
| JP | 2013-530888 | A | 8/2013 |

OTHER PUBLICATIONS

International Preliminary Report on Patentability dated May 10, 2022 and Written Opinion of the International Searching Authority dated Jan. 19, 2021 received in PCT/JP2020/041113.
Japanese Office Action dated Oct. 10, 2023 received in 2019-200910.
Taiwanese Office Action dated Mar. 12, 2025 received in 109138349.

* cited by examiner

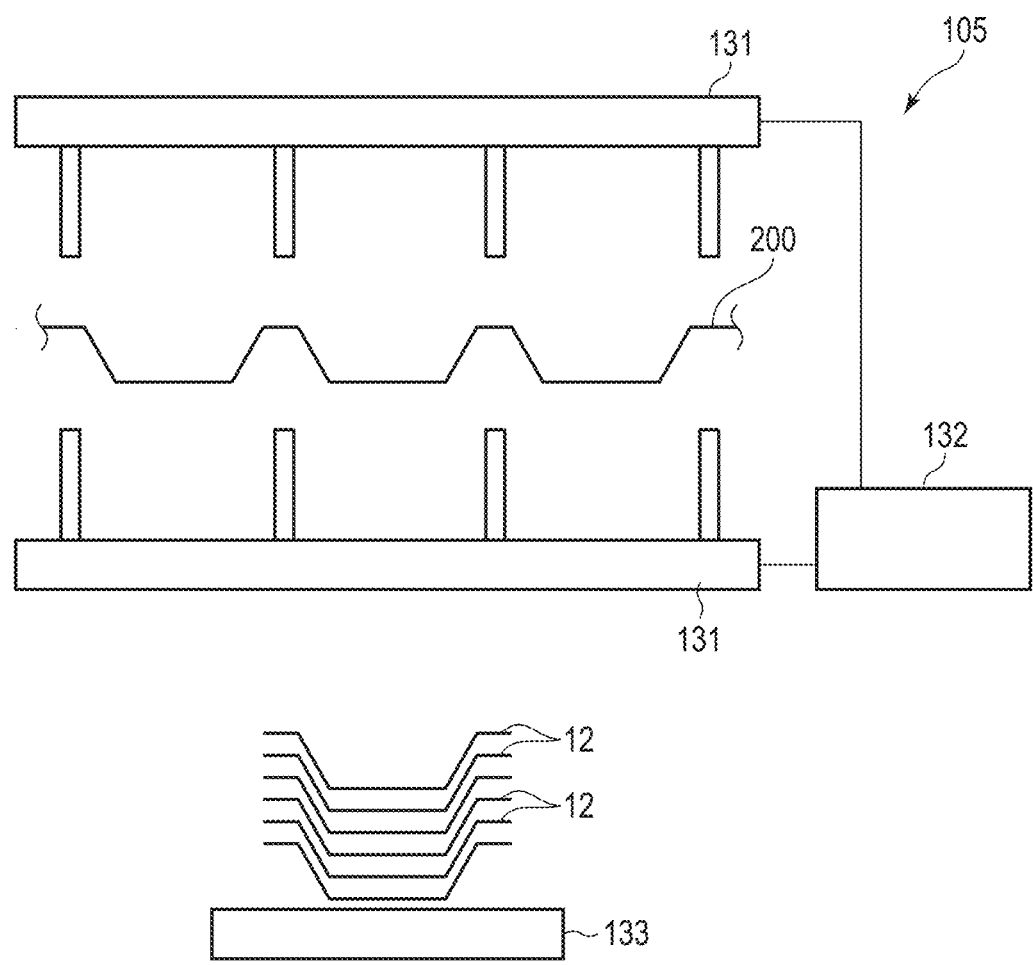
F I G. 12

| | Embodiment | | | | Comparative example |
|---|---|---|---|---|---|
| | $n_1$ | $n_2$ | $n_3$ | Average value | Average value |
| e | 0.209mm | 0.191mm | 0.198mm | 0.199mm | 0.120 |
| f | 0.278mm | 0.290mm | 0.285mm | 0.284mm | 0.230 |
| g | 0.214mm | 0.205mm | 0.195mm | 0.205mm | 0.250 |

| | $n_1$ | $n_2$ | $n_3$ | $n_4$ | $n_5$ | $n_6$ | $n_7$ | $n_8$ | $n_9$ | $n_{10}$ |
|---|---|---|---|---|---|---|---|---|---|---|
| Embodiment | 0 | 0 | 0 | 0 | 0 | 0 | 0 | 0 | 0 | 0 |

|  |  | Test liquid amount | 20° | 30° | 40° | 50° | 60° |
|---|---|---|---|---|---|---|---|
| Embodiment | Container body + lid | 168[g] | No | No | Yes | / | / |
|  | Container body (without lid) | 169[g] | No | No | Yes | / | / |
| Comparative example | Container body + FM lid | 181[g] | / | / | No | No | Yes |
|  | Container body (without FM lid) | 184[g] | No | Yes | / | / | / |

FIG. 18

|  | Site A | Site B |
|---|---|---|
| Embodiment | 38.2°C | 36.7°C |
| Comparative example | 75.9°C | 68.8°C |

FIG. 19

| Participant | | Woman in her twenties | Man in his twenties | Man in his thirties |
|---|---|---|---|---|
| Embodiment | Fitting manner | | | |
| | Time [sec] | 1.26 | 2.59 | 1.93 |
| Comparative example | Fitting manner | | | |
| | Time [sec] | 12.08 | 4.96 | 3.91 |

FIG. 20

LID, MOLD, AND LID MANUFACTURING METHOD

CROSS-REFERENCE TO RELATED APPLICATIONS

This is a Continuation Application of PCT application No. PCT/JP2020/041113, filed Nov. 2, 2020, which was published under PCT Article 21(2) in Japanese.

This application is based upon and claims the benefit of priority from Japanese Patent Application No. 2019-200910, filed Nov. 5, 2019, the entire contents of which are incorporated herein by reference.

FIELD

The present invention relates to a lid for covering a container body for storing a beverage or the like, a mold for forming the lid, and a method for manufacturing the lid.

BACKGROUND

It has been popular in recent years for stores such as convenience stores to sell beverage products, for example, coffee, in a container. The container uses a known structure in which a lid having a drinking hole is attached to the rim of a container body, for example, a paper cup.

In such a container, the drinking hole of the lid is located above the opening of the container body. Thus, the container needs to be tilted a large amount for the content to reach the drinking hole and then the mouth, and as such, difficulty in drinking is a problem. Also, drinking with this container requires direct contact between the lips and a region of the drinking hole without permitting the content to be visually recognized at the timing that it comes out from the drinking hole. Thus, there is another problem that the content may come out from the drinking hole at some unexpected timing, and the lips or the inside of the mouth could be burned if the content is hot. Further, the lid is formed from a molded thin resin plate, so the periphery of the drinking hole is also formed of the resin, which has a poor thermal insulating property. Thus, the periphery of the drinking hole is heated by a hot content at the time of drinking, and the lips contacting the periphery could be burned.

In consideration of the above, a lid having a drinking hole at a lower level than the rim of a container body has been proposed in, for example, Jpn. Pat. Appln. KOKAI Publication No. 2008-308225. When the lips come into contact with this type of lid for drinking the content of a container body, the lid first allows the content to come out from the drinking hole and to its top without causing the content to directly touch the mouth, and then allows the content to flow on the top toward the mouth for contact with the mouth. Thus, it is possible with this lid to cool and drink the content while checking the temperature of the content, and accordingly, it is possible to safely take in a hot content.

SUMMARY

According to an aspect of the present invention, a lid includes a circular top portion, a fitting portion, and a skirt portion. The top portion has a drinking hole at its peripheral portion. The fitting portion includes an inner fitting portion protruding upwardly from a peripheral end of the top portion and adapted to contact a rim-side inner circumferential surface of a container body, and an upper fitting portion thicker than the inner fitting portion and adapted to be fitted onto a rim of the container body. An upper end of the fitting portion is at a level higher than the drinking hole. The skirt portion at its upper end is continuous with an outer-side lower end of the fitting portion. The skirt portion extends downwardly away from the rim of the container body. The skirt portion is adapted to cover a rim-side outer circumferential surface of the container body.

According to an aspect of the present invention, a mold is for use in vacuum pressure molding, and includes multiple cavities for forming a circular top portion and a fitting portion which is to be fitted onto a rim of a container body. In the mold, an end of a part for forming the fitting portion constitutes a sheet-side leading end of the cavities for contacting a sheet that undergoes the vacuum pressure molding.

According to an aspect of the present invention, a lid manufacturing method includes: heating a resin sheet; moving, to the heated sheet, at least a mold for a pressure molding apparatus which includes multiple cavities for forming a circular top portion and a fitting portion to be fitted onto a rim of a container body, so that a part of the cavities for forming the fitting portion is first brought into contact with the sheet; further moving the mold in conjunction with a pressure box for the pressure molding apparatus to a molding position; and controlling a vacuum pump to subject the sheet to vacuum drawing with the mold and controlling a compressor to subject the sheet to pressure blowing with the pressure box.

BRIEF DESCRIPTION OF THE DRAWINGS

FIG. 12 is an explanatory view schematically showing a configuration of a trimming apparatus for use in the manufacturing apparatus.

FIG. 18 is an explanatory chart showing results of a third evaluation test on the lids.

FIG. 19 is an explanatory chart showing results of a fourth evaluation test on the lids.

FIG. 20 is an explanatory chart showing results of a fifth evaluation test on the lids.

DETAILED DESCRIPTION

Figure 1:
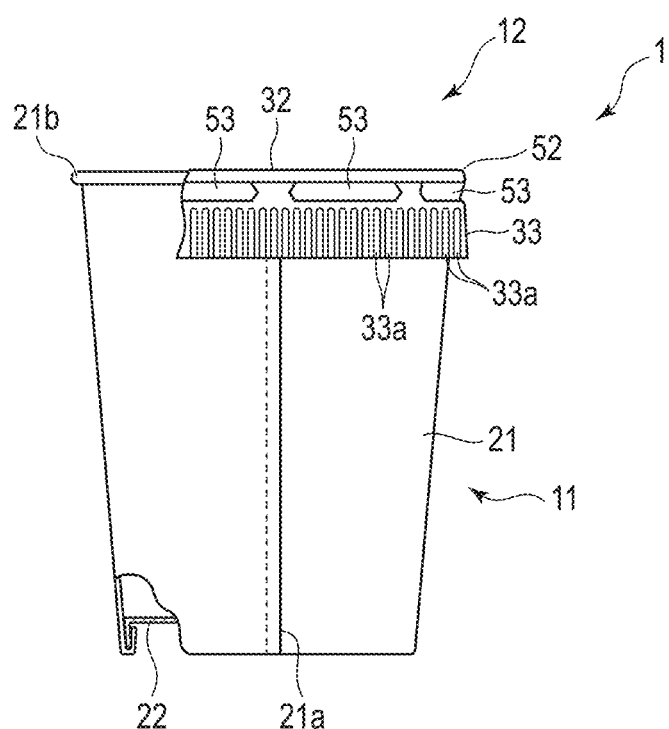
FIG. 1 is a side view showing, with a partial cutaway, a structure of a container according to an embodiment of the present invention.
Figure 2:
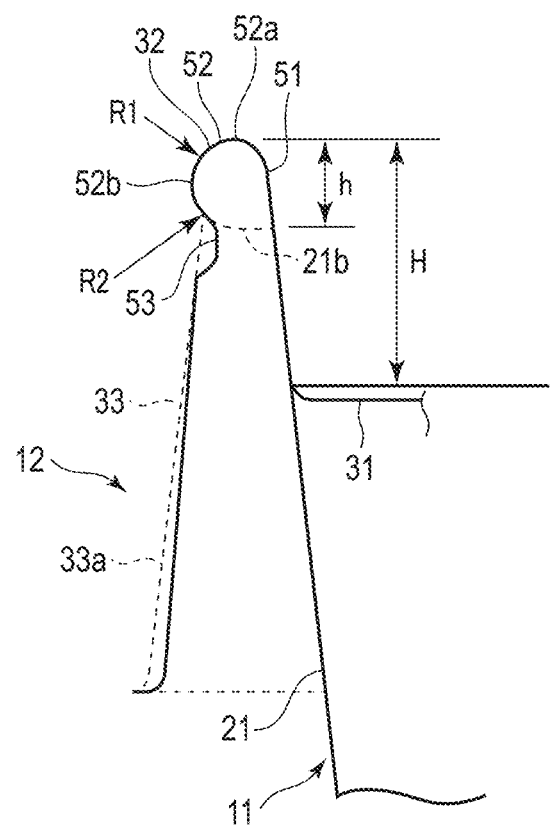
FIG. 2 is a sectional view showing a main structure of the container.
Figure 3:
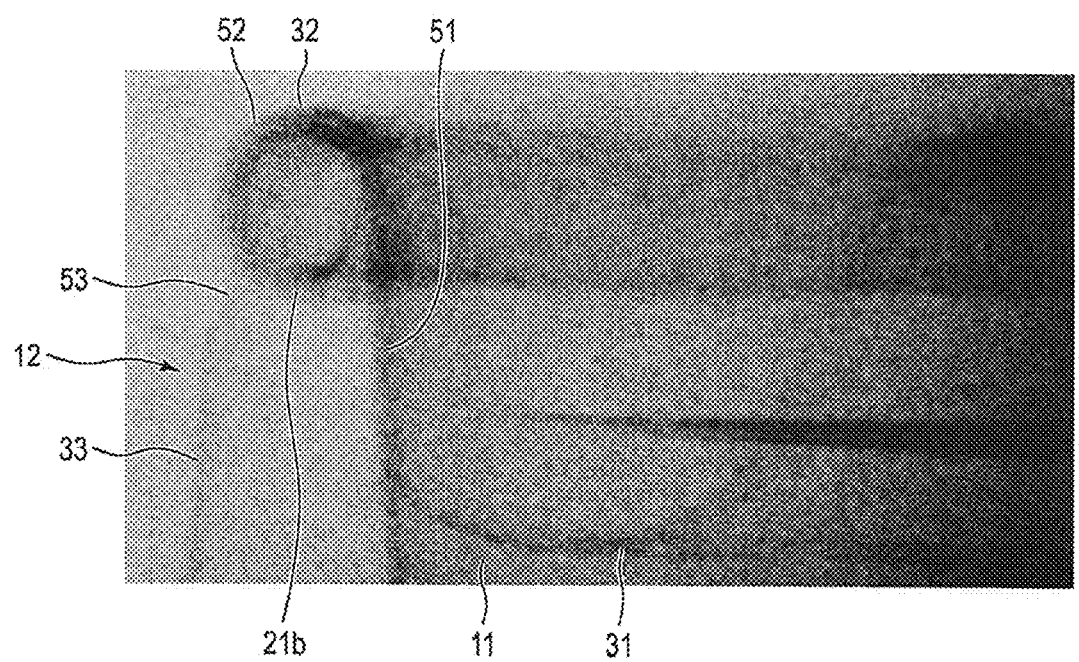
FIG. 3 is an illustrative view showing the main structure of the container.
Figure 4:
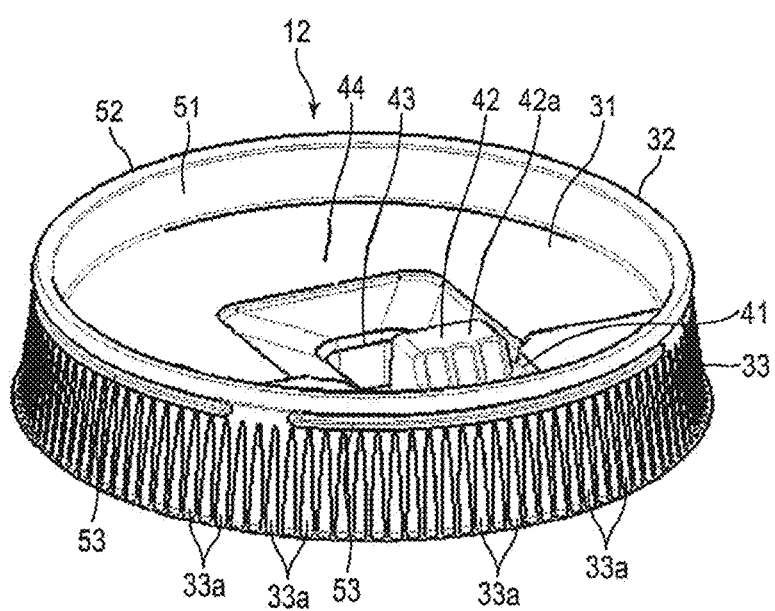
FIG. 4 is a perspective view showing a structure of a lid of the container.
Figure 5:
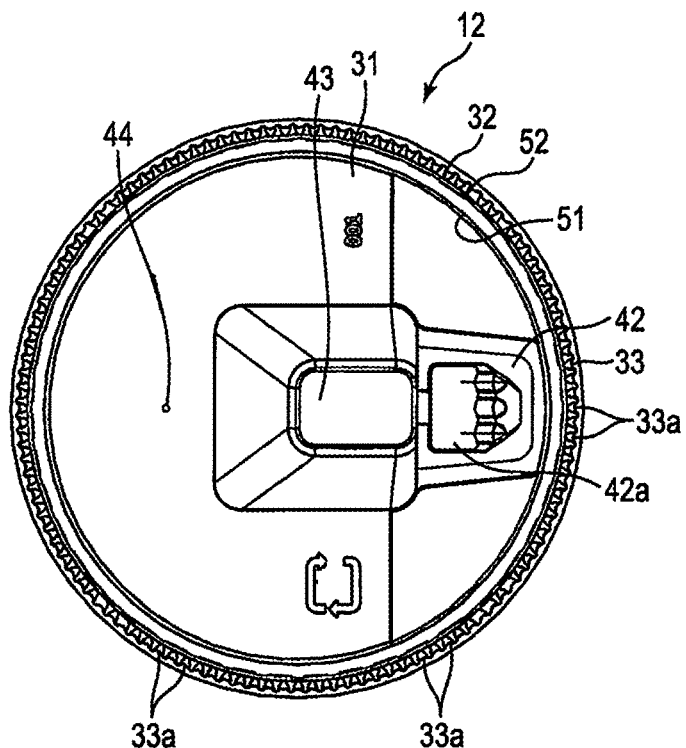
FIG. 5 is a plan view showing the structure of the lid.
Figure 6:
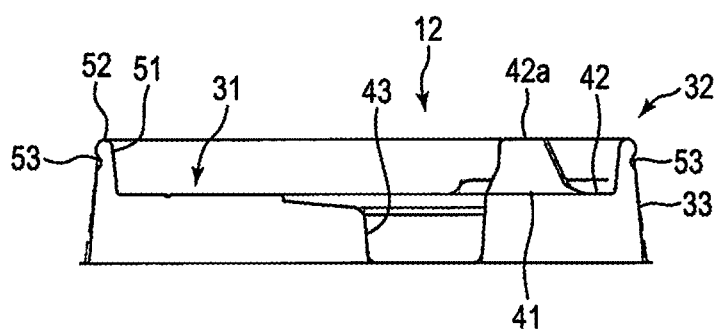
FIG. 6 is a sectional view showing the structure of the lid.
Figure 7:
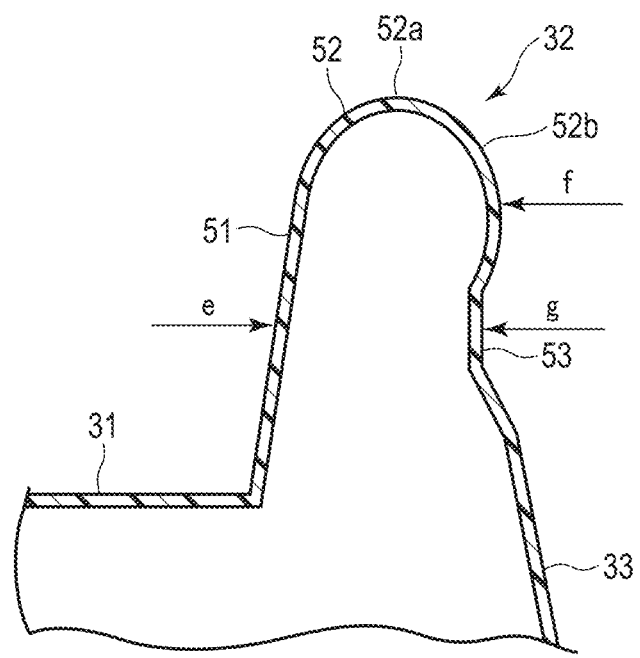
FIG. 7 is an enlarged sectional view showing a structure of a fitting portion of the lid.

A container 1 according to an embodiment of the present invention will be described with reference to FIGS. 1 to 7. FIG. 1 is a side view showing, with a partial cutaway, a structure of the container 1 according to an embodiment of the present invention. FIG. 2 is a sectional view schematically showing a structure of the container 1, including a rim 21b of a container body 11 and a fitting portion 32 of a lid 12. FIG. 3 is an illustrative view constituted by an enlarged image acquired by an X-ray transmission apparatus, showing the structure including the rim 21b of the container body 11 and the fitting portion 32 of the lid 12. FIG. 4 is a perspective view, FIG. 5 is a plan view, and FIG. 6 is a sectional view, each showing a structure of the lid 12. FIG. 7 is an enlarged sectional view schematically showing the fitting portion 32 of the lid 12.

(Structure of Container 1)

The container 1 includes, as shown in FIGS. 1 to 3, the container body 11 and the lid 12. The container 1 is for storing a content such as a beverage. Examples of the content here include a hot beverage such as hot coffee. The container 1 is employed in, for example, stores such as a convenience store and a coffee shop for beverage supplying services. The description will assume upper and lower directions in association with a posture of the container 1 that enables the container 1 to store the content, defining that the container body 11 in this posture is on the lower side while the lid 12 is on the upper side.

The container body 11 is, for example, a cup container as shown in FIG. 1, which is formed from a resin material or a paper base material. For this embodiment, the description will assume an example where the container body 11 is a cup container formed from a paper base material, i.e., a paper cup. As shown in FIG. 1, the container body 11 includes a trunk portion 21 and a bottom portion 22.

The trunk portion 21 has a shape of a cylinder with one end (a lower end) provided with the bottom portion 22 and the other end (an upper end) having an opening. The trunk portion 21 gradually increases in diameter from one end toward the other end with the opening. In one example, the trunk portion 21 is formed by turning a rectangular or fan-shaped paper base material into a cylinder and bonding its opposing ends together in an overlapping manner. As such, the trunk portion 21 has a seam 21a due to the two overlapped ends of the paper base material being bonded to each other.

The trunk portion 21 also has the rim 21b forming the opening of the other end. The rim 21b is a so-called "top curl" formed by curling the end of the trunk portion 21. The rim 21b is annularly formed. The rim 21b protrudes outward from the outer circumferential surface of the end of the trunk portion 21. The rim 21b is wound several times so as to have a substantially circular cross section. In the container body 11, the rim 21b has a height h in the axial direction which is set to, for example, approximately 2.8 mm.

The bottom portion 22 is provided on the one end side of the trunk portion 21. The bottom portion 22 is positioned slightly inside the trunk portion 21 with respect to one end of the trunk portion 21, where the bottom portion 22 is bonded to the trunk portion 21 as an integral part. The bottom portion 22 closes the one end of the trunk portion 21.

As shown in FIG. 1, the lid 12 is fitted onto the rim 21b of the container body 11 in a detachable way. As shown in FIGS. 1 to 6, the lid 12 includes a top portion 31, the fitting portion 32, and a skirt portion 33. The lid 12 is formed by integrally molding a sheet-like resin material into the top portion 31, the fitting portion 32, and the skirt portion 33. Examples of the resin material for forming the lid 12 include polystyrene (PS), polypropylene (PP), polyethylene terephthalate (PET), and a biodegradable resin. The resin material is in the form of a rolled sheet, i.e., a wound sheet-like resin material. The rolled sheet undergoes molding by a manufacturing apparatus 100 so that the lid 12 is formed.

The top portion 31 may have a surface shape including flat parts, recesses, projections, etc. as shown in FIGS. 4 to 6, which are discretionarily set according to design preference, usability such as easiness of drinking, and so on. The top portion 31 is circular in a plan view. The top portion 31 includes, for example, a drinking hole 41, a tab 42, a tab receiver 43, and a small hole 44.

The drinking hole 41 is formed at the peripheral portion of the top portion 31. The drinking hole 41 is formed using a score line provided on the top portion 31. Here, the score line provided on the top portion 31 is a slit in the top portion 31. The score line is formed along the contour of the drinking hole 41 with its two ends separated from each other. Therefore, the region of the top portion 31, which is surrounded by the score line, opens upon being rotated about a hinge that connects the two ends of the score line, so that the drinking hole 41 is formed for the content to pass through. In one example, the hinge connecting two ends of the score line is a linear groove provided in the top portion 31.

The shape of the drinking hole 41 may be discretionarily set. For example, the score line and the hinge surround a trapezoidal region such that the score line constitutes the short side and the inclined sides while the hinge constitutes the long side, as shown in FIG. 5. Accordingly, the drinking hole 41 is formed as a trapezoidal opening having a narrow width on the outer peripheral side of the top portion 31.

The tab 42 is constituted by the region of the top portion 31, surrounded by the score line and the hinge, and continuous with other regions of the top portion 31 via the hinge. The tab 42 covers the drinking hole 41 and opens the drinking hole 41 by being rotated about the hinge. The tab 42 therefore opens and closes the drinking hole 41. The tab 42, while being formed from the region of the top portion 31 surrounded by the score line, includes a projection 42a in which a part of the region upwardly projects. The projection 42a of the tab 42 has, for example, a shape of a trapezoidal frustum with a rectangular bottom which is located on the side of the top portion 31 and which is larger than the top.

The tab receiver 43 is formed as a downward dent in the top portion 31. The tab receiver 43 is formed at a position symmetrical to the projection 42a of the tab 42 with respect to the hinge connecting the two ends of the score line. In one concrete example, the tab receiver 43 is positioned near the center of the top portion 31. The tab receiver 43 is formed in such a shape that allows the projection 42a of the tab 42 to be fitted in. The tab receiver 43 maintains the opened state of the drinking hole 41 by engaging with the projection 42a to hold the tab 42 that has rotated about the hinge.

The small hole 44 is provided in a part of the top portion 31. The small hole 44 serves as a release hole for releasing an increased internal pressure of the container 1 due to a warm content.

As shown in FIGS. 2 to 6, the fitting portion 32 is formed integrally with the peripheral portion of the top portion 31. As shown in FIGS. 3 and 5, the fitting portion 32 is an annular wall that protrudes upwardly from the peripheral portion of the top portion 31. The fitting portion 32 includes an inner fitting portion 51, an upper fitting portion 52, and a concave portion 53.

The inner fitting portion 51 contacts the inner circumferential surface of the container body 11. The contact between the inner fitting portion 51 and the inner circumferential surface of the container body 11 is watertight. In one example, at least in the state where the lid 12 is attached to the container body 11, the inner fitting portion 51 has an outer diameter equal to the inner diameter formed by the inner circumferential surface of the container body 11, and has a same inclination angle as that of the inner circumferential surface of the container body 11. Accordingly, when the lid 12 is attached to the container body 11, the inner fitting portion 51 comes into contact with the inner circumferential surface of the container body 11 annularly around it for a given height range, so that the boundary with the container body 11 is water-tightly sealed.

The height of the inner fitting portion 51, indicated as a height H in FIG. 2, is preferably 3 mm to 10 mm, or more preferably 3 mm to 8 mm. This is because if the height H of the inner fitting portion 51 is smaller than 3 mm, the sealing performance for the content is degraded, which can easily incur a leakage of liquid when the container body 11 is tilted. Also, if the height H of the inner fitting portion 51 is greater than 10 mm, the molding for the lid 12 would require an increased amount of material, which is economically inefficient as it would increase the manufacturing cost of the lid 12. Further, with such a large height H, the location of the top portion 31 when it is attached to the container body 11 descends, which degrades the usability as making the container 1 reduce its storable content amount. Note that the height H of the inner fitting portion 51 refers to the distance along the axial direction of the fitting portion 32, from the lower end of a part of the fitting portion 32 that contacts the inner circumferential surface of the container body 11 to the upper end of the rim of the container body 11.

The upper fitting portion 52 is coupled with the open end of the container body 11. More concretely, the upper fitting portion 52 is fitted onto the rim 21b of the container body 11. The upper fitting portion 52 is formed to have a thickness larger than that of the inner fitting portion 51. The upper fitting portion 52 has a sectional shape showing an arc-like curve constituted by multiple continuous arcs of different curvature radii. The upper fitting portion 52 is formed to be capable of being fitted onto the rim 21b of the container body 11 by, for example, having substantially the same shape as the outer shape of the rim 21b.

In one example, the upper fitting portion 52 has an annular upper arc portion 52a forming a top part and an annular lower arc portion 52b forming an outer circumferential part, as shown in FIGS. 2 and 7. The upper arc portion 52a and the lower arc portion 52b each have an arc-like cross section. The upper arc portion 52a and the lower arc portion 52b are set to be arc shapes of different curvature radii. That is, the upper fitting portion 52 has a sectional shape in which two arcs having different curvature radii are connected to each other. As one example, the upper arc portion 52a of the upper fitting portion 52 shown in FIG. 2 is set to have a curvature radius R1 of approximately 1.4 mm. As one example, the lower arc portion 52b of the upper fitting portion 52 shown in FIG. 2 is set to have a curvature radius R2 of approximately 1.6 mm.

For the upper fitting portion 52, the end of the upper arc portion 52a that forms the top part is set to be the highest position on the lid 12. Note that the upper fitting portion 52 serves the purpose when provided at the highest position on the lid 12, and other structures, for example, the tab 42, may also be provided at the same height as the upper fitting portion 52 in concrete implementations.

The concave portion 53 is provided at a part of the upper fitting portion 52 that is continuous with the skirt portion 33. The concave portion 53 is a dent toward the radially inside portion and extends in the circumferential direction. In one example, more than one concave portion 53 is provided at given intervals. That is, multiple concave portions 53 are arranged at predetermined intervals. Note that, in one example, one of the concave portions 53 is provided at a position facing the drinking hole 41 and around the central axis of the lid 12. For example, in more specific terms, the center of one of the multiple concave portions 53 faces the drinking hole 41.

The concave portion 53 extends in an arc shape, and has an arcuate cross section along the axial direction of the lid 12. In one concrete example, the concave portion 53 is formed so that its sectional shape along the axial direction of the lid 12 shows a semicircular dent. The concave portion 53 is engaged with the lower outer circumferential surface of the rim 21b of the container body 11. Accordingly, the multiple concave portions 53 are fitted onto the rim 21b of the container body 11. More specifically, the multiple concave portions 53 are fitted onto the lower-end side outer circumferential surface of the rim 21b of the container body 11.

The skirt portion 33 is a cylindrical annular wall suspended from the outer lower end of the upper fitting portion 52 of the fitting portion 32. In one example, the skirt portion 33 extends downward toward the lower side of the container body 11. The skirt portion 33 is formed into a tapered shape that increases in diameter in the radially outward direction from the upper side to the lower side. The skirt portion 33 is spaced apart from the outer circumferential surface of the trunk portion 21 in the state where the lid 12 is attached to the container body 11.

In one example, the skirt portion 33 includes, between its upper end and lower end, multiple circumferentially arranged grooves 33a each extending along the direction which is orthogonal to the circumferential direction and in which the skirt portion 33 extends. For example, each groove 33a has an arcuate cross section along the direction orthogonal to the axial direction of the lid 12. In one concrete example, the groove 33a is formed into a shape that gradually increases in depth from the upper side toward the lower side of the skirt portion 33 and has a sectional shape with a semicircular dent along the direction orthogonal to the axial direction of the lid 12.

The skirt portion 33 preferably has a length of, for example, 10 mm to 20 mm. This is because if the skirt portion 33 is shorter than 10 mm, lips may touch the lower end of the skirt portion 33 when drinking the content, and a sense of discomfort can be caused, making the drinking difficult, which is not desirable. Also, if the skirt portion 33 is longer than 20 mm, the molding for the lid 12 would require an increased amount of material, which is economically inefficient as it would increase the manufacturing cost of the lid 12, and is therefore undesirable.

(Manufacturing Apparatus 100 for Lid 12)

Next, a description will be given of the manufacturing apparatus 100 for manufacturing the lid 12, with reference to FIGS. 8 to 12.

Figure 8:
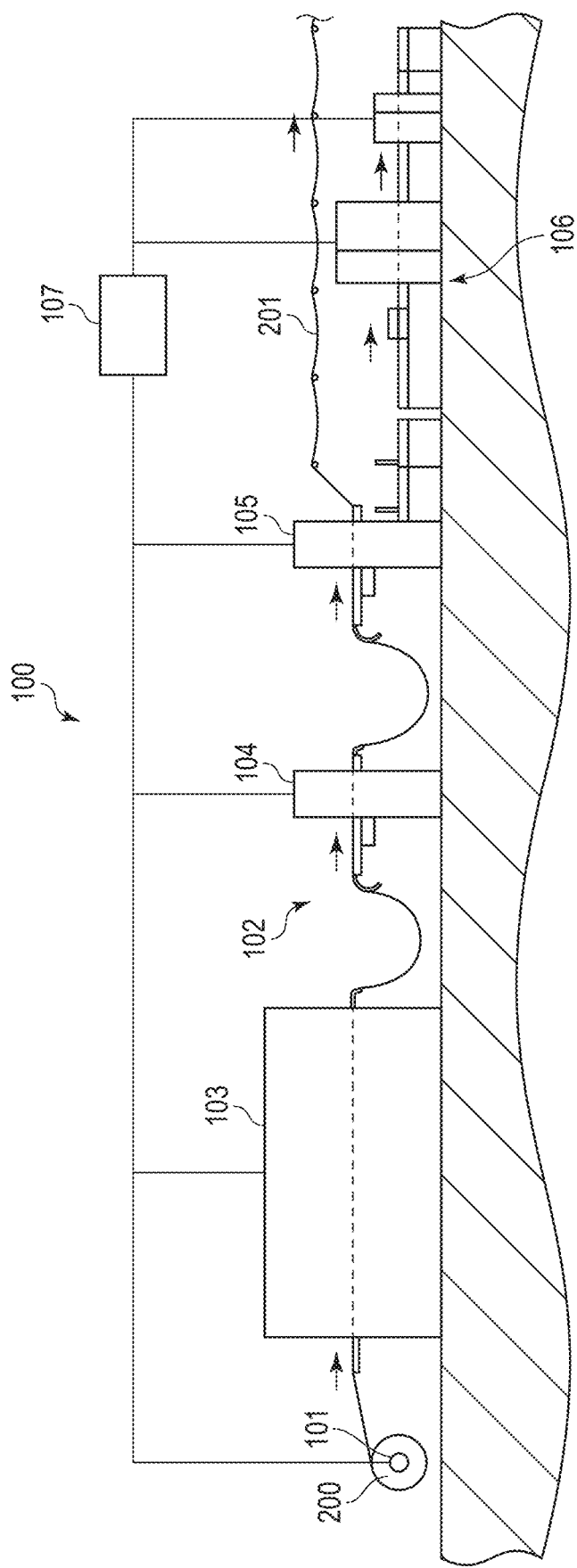
FIG. 8 is an explanatory view schematically showing a configuration of a manufacturing apparatus for manufacturing the lid.
Figure 9:
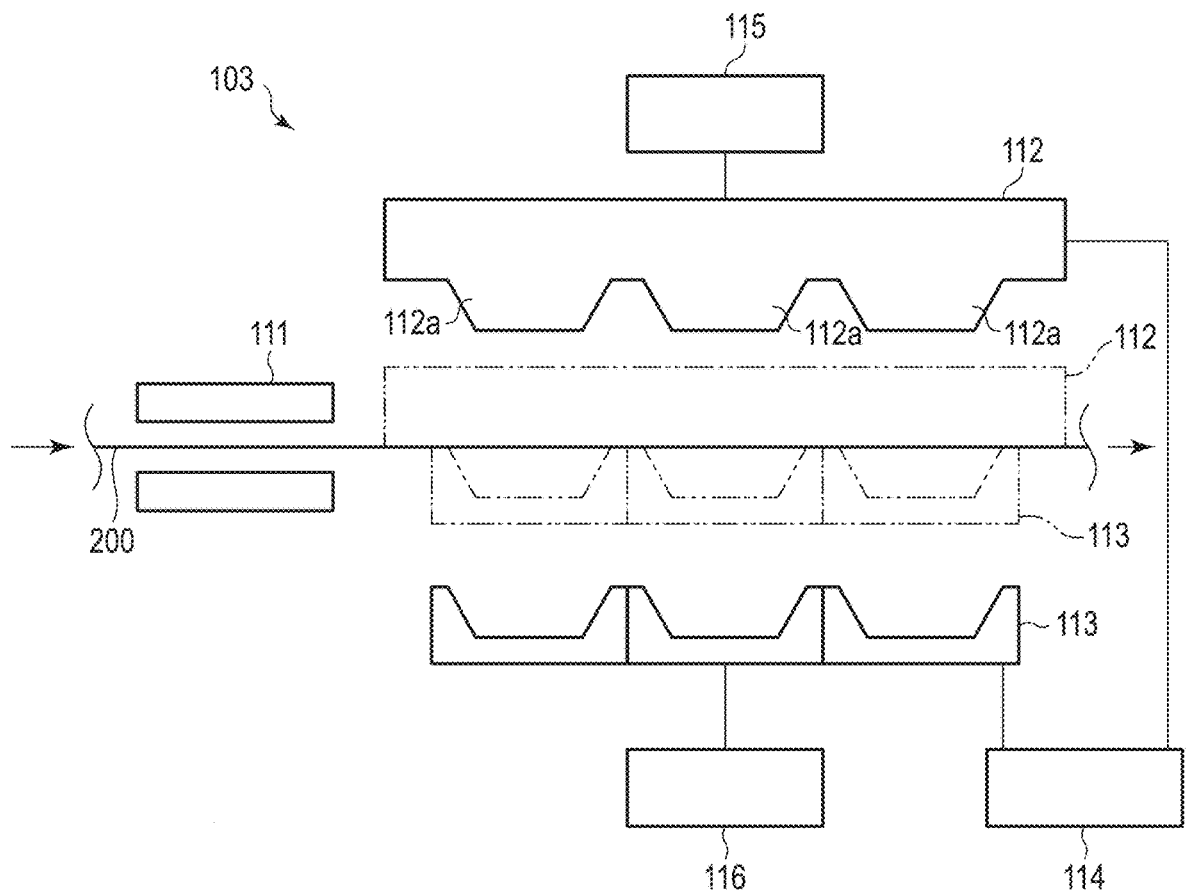
FIG. 9 is an explanatory view schematically showing a configuration of a pressure molding apparatus for use in the manufacturing apparatus.
Figure 10:
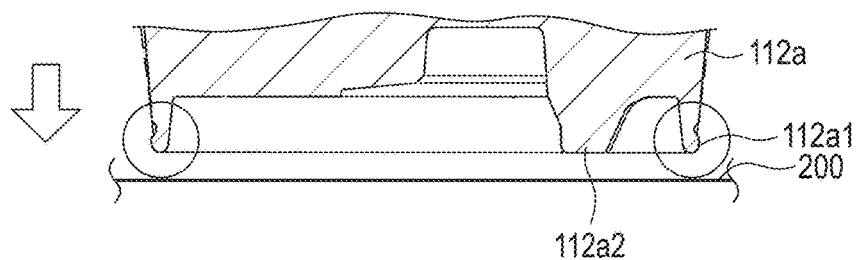
FIG. 10 is an explanatory view showing a cavity structure of a mold of the pressure molding apparatus.
Figure 11:
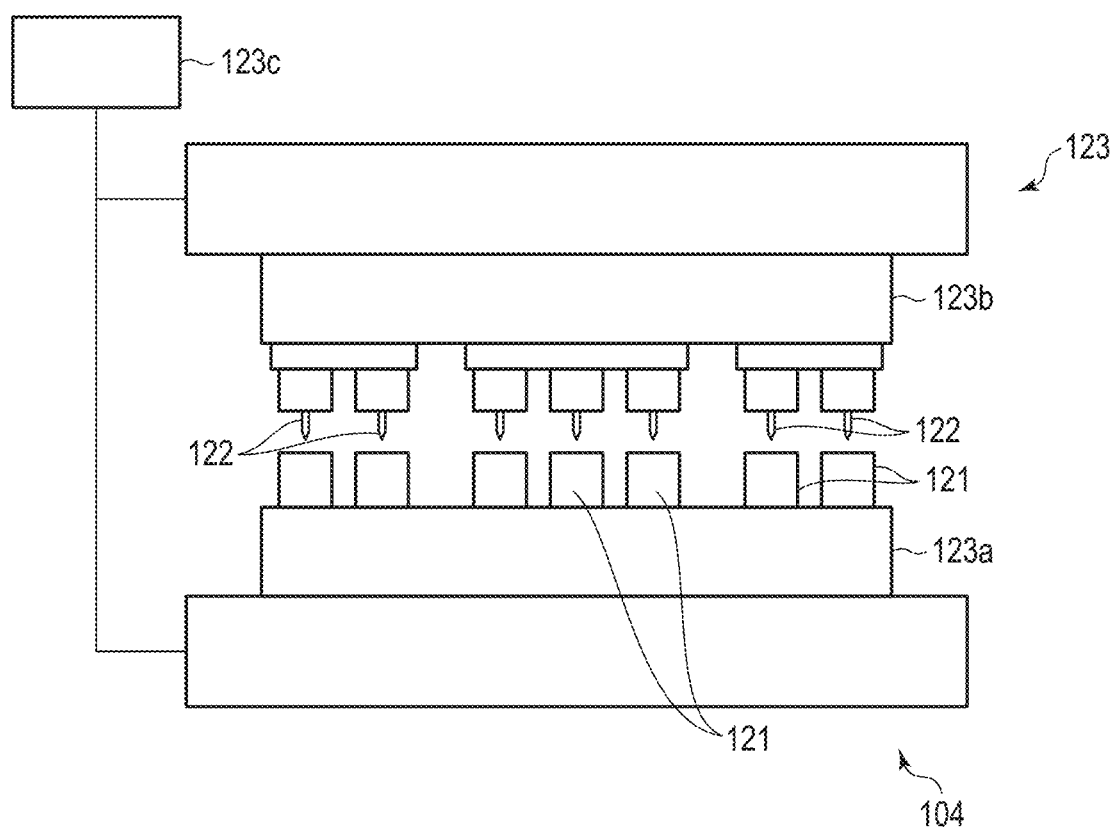
FIG. 11 is an explanatory view schematically showing a configuration of a punching apparatus for use in the manufacturing apparatus.

FIG. 8 is an explanatory view schematically showing a configuration of the manufacturing apparatus 100. FIG. 9 is an explanatory view schematically showing a configuration of a pressure molding apparatus 103. FIG. 10 is an explanatory view showing a structure of one cavity 112a of a mold 112 of the pressure molding apparatus 103. FIG. 11 is an explanatory view schematically showing a configuration of a punching apparatus 104. FIG. 12 is an explanatory view schematically showing a configuration of a trimming apparatus 105.

As shown in FIG. 8, the manufacturing apparatus 100 includes a feeding apparatus 101, a conveyance path 102, the pressure molding apparatus 103, the punching apparatus 104, the trimming apparatus 105, and a post-processing apparatus 106. Here, the manufacturing apparatus 100 includes a controller 107 for controlling the feeding apparatus 101, the pressure molding apparatus 103, the punching apparatus 104, the trimming apparatus 105, and the post-processing apparatus 106.

The feeding apparatus 101 holds and rotates a rolled sheet 200. The feeding apparatus 101 feeds the rolled sheet 200 to the conveyance path 102.

The conveyance path 102 conveys the rolled sheet 200 fed by the feeding apparatus 101 to the pressure molding apparatus 103, the punching apparatus 104, the trimming apparatus 105, and the post-processing apparatus 106 in order. The conveyance path 102 also conveys a skeleton 201 of the rolled sheet 200, from which the lid 12 has been punched out, to a collection site. The conveyance path 102 includes a conveying mechanism constituted by multiple conveyance rollers, a conveyor, etc., so as to convey the rolled sheet 200 as appropriate according to the manufacturing process.

As shown in FIG. 9, the pressure molding apparatus 103 includes a heater 111, a mold 112, a pressure box 113, a mold clamping device 114, a vacuum pump 115, and a compressor 116.

The heater 111 is provided on a location of the conveyance path 102 that is an upstream side of the mold 112 and the pressure box 113. The heater 111 heats the fed rolled sheet 200 to a temperature at which molding is enabled.

As shown in FIGS. 9 and 10, the mold 112 has multiple cavities 112a each formed in the shape of the lid 12. The mold 112 includes a flow path for vacuum drawing, which is in fluid communication with the vacuum pump 115. The mold 112 forms portions of the rolled sheet 200 which face the respective cavities 112a into shapes of such cavities 112a by subjecting the rolled sheet 200 to vacuum drawing in each of the cavities 112a.

In one example, the multiple cavities 112a of the mold 112 are aligned or arranged in a staggered pattern. The cavity 112a is formed in the shape corresponding to the inner surface shape of the lid 12. In other words, the cavity 112a has an outer surface that conforms to the bottom surface shape of the lid 12, assuming a state where the lid 12 is attached to the container body 11. The cavity 112a is formed in such a shape that the outer surface of a portion 112a1 for forming the upper fitting portion 52 of the fitting portion 32 first comes into contact with the rolled sheet 200. More specifically, among portions of the cavity 112a, the portion 112a1 for forming the upper fitting portion 52 constitutes a leading end of the cavity 112a.

Such a mold 112 is arranged, for example, above the pressure box 113. The cavity 112a is formed so that the portion for forming the upper fitting portion 52 is located below the portions for forming the top portion 31, the fitting portion 32 other than the upper fitting portion 52, and the skirt portion 33. Note that, as shown in FIG. 10, the cavity 112a may be formed so that the end of a portion 112a2 for forming the tab 42 is set at the same level as the end of the portion 112a1 for forming the upper fitting portion 52, in the direction indicated by an arrow in FIG. 10, in which the mold 112 moves toward the rolled sheet 200. In the cavity 112a of this form, the end of the portion 112a1 for forming the upper fitting portion 52 and the end of the portion 112a2 for forming the tab 42 simultaneously come into contact with the rolled sheet 200.

The pressure box 113 is arranged to face the mold 112 with the rolled sheet 200 interposed therebetween. The pressure box 113 has a flow path for pressure application, which is in fluid communication with the compressor 116. The pressure box 113 presses the rolled sheet 200 toward the cavity 112a of the mold 112 by means of compressed air supplied from the compressor 116, so that the portion of the rolled sheet 200 which faces the cavity 112a is molded into the shape of this cavity 112a. That is, the mold 112 and the pressure box 113 subject the rolled sheet 200 to the vacuum pressure molding with the multiple cavities 112a so as to form the rolled sheet 200 into the shape of multiple lids 12.

As such, the mold 112 constitutes an upper mold for molding the rolled sheet 200 into the shape of multiple lids 12, and the pressure box 113 constitutes a lower mold corresponding to this upper mold.

The mold clamping device 114 causes the mold 112 and the pressure box 113 to move between a standby position and a molding position for the rolled sheet 200.

The vacuum pump 115 creates a negative pressure between the multiple cavities 112a and the rolled sheet 200 facing these cavities 112a.

The compressor 116 supplies compressed air to the pressure box 113.

As shown in FIG. 11, the punching apparatus 104 includes multiple score cutters 121, multiple pilot punches 122, and a moving mechanism 123. The score cutters 121 are provided in a number equal to the number of the cavities 112a of the mold 112. The score cutters 121 form score lines in predetermined parts of the multiple lids 12 formed over the rolled sheet 200.

The pilot punches 122 are provided in a number equal to the number of the score cutters 121. The pilot punches 122 form the small holes 44 in predetermined positions of the multiple lids 12 formed over the rolled sheet 200.

The moving mechanism 123 includes a lower die 123a holding the multiple score cutters 121, an upper die 123b holding the multiple pilot punches 122, and a pushing device 123c adapted to move the lower die 123a and the upper die 123b by a predetermined push amount.

As shown in FIG. 12, the trimming apparatus 105 includes a pair of punching blades 131, a moving mechanism 132, and a collecting section 133. The pair of punching blades 131 are provided above and below the rolled sheet 200. The pair of punching blades 131 punch out the multiple lids 12 from the rolled sheet 200 in such a manner as to abut each other, punching the rolled sheet 200 at the opening ends of the respective skirt portions 33 of the molded multiple lids 12.

The moving mechanism 132 causes the pair of punching blades 131 to move between a standby position and a punching position. The collecting section 133 stacks the multiple lids 12 punched out from the rolled sheet 200 by the pair of punching blades 131.

The post-processing apparatus 106 is, for example, an apparatus for inspecting and packing the multiple lids 12 stacked in the collecting section 133. The controller 107 controls each apparatus.

(Method for Manufacturing Lid 12)

Next, a method of manufacturing the lid 12 with the manufacturing apparatus 100 will be described with reference to the flowchart in FIG. 13.

Figure 13:
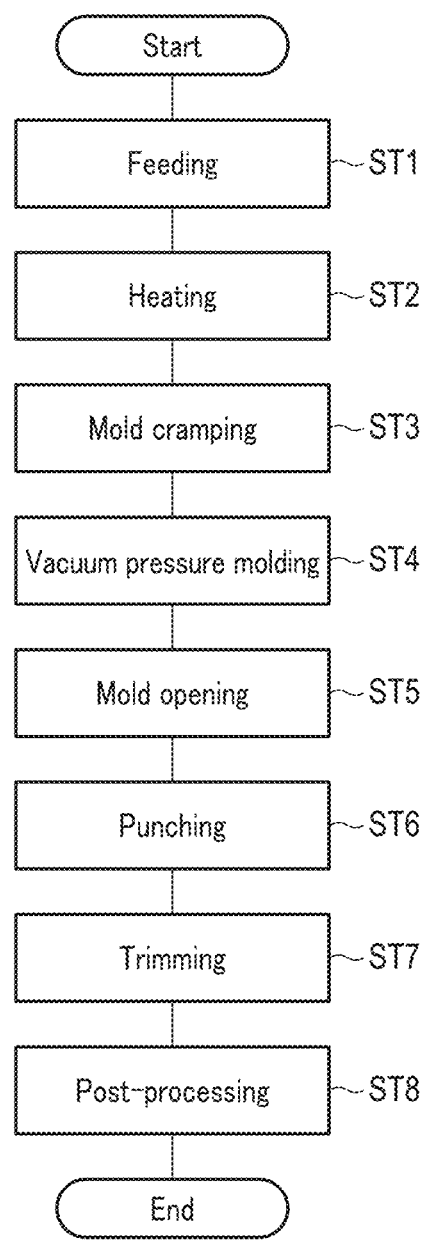
FIG. 13 is a flowchart showing an example of a method for manufacturing the lid.

First off, as indicated in FIG. 13, the controller 107 controls the feeding apparatus 101 to feed the rolled sheet 200 along the conveyance path 102 (step ST1). Next, the controller 107 controls the heater 111 of the pressure molding apparatus 103 to heat the conveyed rolled sheet 200 (step ST2). The controller 107 subsequently controls the mold clamping device 114 of the pressure molding apparatus 103 to carry out mold clamping by moving the mold 112 and the pressure box 113 to the molding position (step ST3). At this time, in each of the multiple cavities 112a of the mold 112, the end of the portion for forming the corresponding upper fitting portion 52 first comes into contact with the heated rolled sheet 200.

Subsequently, the controller 107 conducts vacuum pressure molding of the rolled sheet 200 (step ST4). As an example of the vacuum pressure molding, the controller 107 controls the vacuum pump 115 to subject the rolled sheet 200 to vacuum drawing with the mold 112, and controls the compressor 116 to subject the rolled sheet 200 to pressure blowing with the pressure box 113. Accordingly, a plurality of the shapes of lids 12, except for the score lines and the small holes 44, are formed over the rolled sheet 200.

Next, the controller 107 controls the mold clamping device 114 to carry out mold opening by moving the mold 112 and the pressure box 113 to the standby position (step ST5). Subsequently, the controller 107 conducts a punching process on the rolled sheet 200 (step ST6). As the punching process, the controller 107 controls the pushing device 123c of the moving mechanism 123 to push, by a predetermined push amount, the multiple score cutters 121 and the multiple pilot punches 122 into the conveyed rolled sheet 200 formed with the shapes of the multiple lids 12.

Subsequently, the controller 107 conducts a trimming process on the rolled sheet 200 (step ST7). As the trimming process, the controller 107 controls the moving mechanism 132 of the trimming apparatus 105 to move the pair of punching blades 131 to the punching position so that the multiple lids 12 are punched out from the conveyed rolled sheet 200 where the shapes of the multiple lids 12 are formed. Accordingly, each lid 12 is cut from the rolled sheet 200 in the end shape of the skirt portion 33, and collected at the collecting section 133. Subsequently, the controller 107 conducts post-processes with the post-processing apparatus 106, including inspection, packing, etc. for the multiple lids 12 collected at the collecting section 133 (step ST8).

According to the lid 12 formed in this manner, the fitting portion 32 includes the upper fitting portion 52 having a thickness larger than that of the inner fitting portion 51, and therefore, it is possible to enhance the fitting performance with respect to the peripheral end of the opening, namely, the rim 21b, of the container body 11. Also, since the upper fitting portion 52 has a larger thickness than the inner fitting portion 51, the fitting portion 32 is not easily deformed even when the lips abut the fitting portion 32 or the skirt portion 33 for drinking, and therefore, the lid 12 is prevented from being easily detached from the container body 11. As such, the lid 12 has an enhanced fitting capability.

Also, the fitting portion 32 of the lid 12 has the multiple concave portions 53 between the upper fitting portion 52 and the skirt portion 33. Accordingly, when the fitting portion 32 is fitted onto the rim 21b, each concave portion 53 is engaged with the lower outer circumferential surface of the rim 21b, and therefore, the lid 12 is further prevented from being easily detached from the container body 11, which stabilizes the state of engagement between the container body 11 and the lid 12. Thus, the lid 12 has an enhanced fitting capability.

In the lid 12, the skirt portion 33 is spaced apart from the trunk portion 21 of the container body 11, and therefore, heat from the content in the container body 11 is not conducted to the lips that have come into contact with the skirt portion 33 for drinking, which can prevent a burn on the lips. The skirt portion 33 further serves as a guide for the lid 12 to be put on the container body 11, and accordingly facilitates the action of fitting the lid 12 onto the container body 11.

In the lid 12, the upper fitting portion 52 of the fitting portion 32 is formed in an annular shape and constitutes an upper end of the lid 12 in a posture where it is attached to the container body 11. Thus, for attachment to the container body 11, the lid 12 permits the palm to push and press the entire upper fitting portion 52. The force for fitting the fitting portion 32 onto the rim 21b can be stably applied to the lid 12, and therefore, the lid 12 can be easily fitted onto the container body 11. As such, the lid 12 can improve the operability for attachment to the container body 11.

In the lid 12, one of the multiple concave portions 53 is provided at a position facing the drinking hole 41 such that the concave portion 53 is engaged with the rim 21b at a site where the lips touch. Therefore, the lid 12 can be prevented from being deformed or disengaged from the fitting portion 32, due to the contact by the lips.

To remove the lid 12 from the container body 11, an outside force is applied to the skirt portion 33 so that the skirt portion 33 is operated to detach the lid 12 from the container body 11. The skirt portion 33 has the multiple circumferentially arranged grooves 33a, and therefore, the skirt portion 33 has an improved buckling strength or the like. Accordingly, a deformation in the skirt portion 33 can be suppressed when an outside force is applied to the skirt portion 33 for detaching the lid 12 from the container body 11.

Moreover, since the external force for detaching the lid 12 can be applied in the direction that conforms to the direction of removing the lid 12, it is possible to easily remove the lid 12 from the container body 11. In addition, having the multiple grooves 33a allows the lid 12 to have a high restorability against the occasions where the touch of lips deforms the skirt portion 33.

The multiple grooves 33a provided between the upper and lower ends of the skirt portion 33 each have a shape extending along a direction which is orthogonal to the circumferential direction and in which the skirt portion 33 extends, and therefore, the grooves 33a are consistent with the mold separation direction in which the cavities 112a of the mold 112 are moved away from the rolled sheet 200 which has undergone the molding process. Accordingly, even with the multiple grooves 33a in the skirt portion 33, the lid 12 still shows a high separation performance.

The lid 12 has a structure in which the top portion 31 is continuous with the lower end of the inner fitting portion 51 and the drinking hole 41 is located below the inner fitting portion 51 and the upper fitting portion 52. As such, the upper fitting portion 52 of the lid 12 constitutes the upper end of the lid 12, and accordingly, the content that has passed through the drinking hole 41 is routed through the inner fitting portion 51 and the upper fitting portion 52 to reach the user's mouth. Therefore, the angle of the container 1 that enables the discharge and drinking of the content from the drinking hole 41 agrees with the angle of the container body 11 when drinking the content from the container body 11 alone, without the lid 12.

Since the container 1 does not need to be tilted too much for drinking the content, the container 1 allows for easy drinking of the content while suppressing a spill of the content due to excessive tilting of the container 1. The tilting angle of the container 1 when drinking up the content can also be mitigated. Moreover, as the distance between the liquid surface of the content and the drinking hole 41 is small, it is easy for the user to visually recognize the content from the drinking hole 41.

The inner fitting portion 51 is adapted to be in watertight contact with the inner circumferential surface of the container body 11, while the skirt portion 33 is separated from the outer circumferential surface of the container body 11. Accordingly, heat from the content can be prevented from being conducted to the lips that have come into contact with the fitting portion 32, and therefore, the lips do not sense a hot temperature or will not be burned by the content.

In the course of the molding for the lid 12, the part which first comes into contact with the heated resin sheet (rolled sheet 200) is the end of the portion of the mold 112 that forms the upper fitting portion 52. Here, according to the nature of the pressure molding, portions other than the first contacting portion will be more stretched when a resin sheet is molded into a shape corresponding to the cavity 112a. Therefore, for the lid 12, it is possible to prevent the thickness of the upper fitting portion 52 from being reduced by molding.

That is, according to the mold 112 as well as the method for manufacturing the lid 12, the rolled sheet 200 can be molded into the upper fitting portion 52 without substantially reducing its thickness. Also, in order for the upper fitting portion 52 to have an arc-like cross section, a portion of the cavity 112a of the mold 112 that forms the upper fitting portion 52 also has an arc-like cross section. After the top part of this portion is brought into contact with the rolled sheet 200, the rolled sheet 200 is deformed as the mold 112 is pressed against the rolled sheet 200 so that the rolled sheet 200 is bent inwardly and outwardly at the top part of the cavity 112a, and therefore, the rolled sheet 200 is not easily stretched into a thin form. The mold 112 can accordingly form the thick upper fitting portion 52. On the other hand, after the upper fitting portion 52 is formed, the molding process proceeds in such a manner that the rolled sheet 200 around the formed upper fitting portion 52 comes into contact with the cavity 112a of the mold 112 while becoming thinner since it is pulled by this upper fitting portion 52 (that is, the portion 112a1 of the cavity 112a for forming the upper fitting portion 52) as the mold 112 is further pressed in. Accordingly, portions of the lid 12 other than the upper fitting portion 52 are formed to be thinner than the upper fitting portion 52. The lid 12, obtained by such molding, includes the upper fitting portion 52 having the largest thickness among portions of the fitting portion, and therefore, the lid 12 shows good fitting performance with respect to the rim 21b, makes the fitting portion 32 not easily deformed, and prevents itself from being easily detached from the container body 11.

In the instances where the mold 112 includes the multiple cavities 112a, and the rolled sheet 200 includes adjacent and closely arranged regions to be molded into the lids 12, the amount of the drawn material becomes small and the portions from such closely arranged regions become thinner. However, since the cavities 112a each form the corresponding upper fitting portion 52 first, even in such instances where the neighboring regions on the rolled sheet 200 for forming the lids are close to each other, the upper fitting portions 52 can secure a thickness comparable with the thickness of the rolled sheet 200. Therefore, thickness variations among the upper fitting portions 52 can be prevented, and equivalent fitting performance as targeted can be attained.

Accordingly, even when the regions for forming the multiple lids 12 are densely set on the rolled sheet 200 for obtaining as many lids 12 as possible, the formed lids 12 can provide the fitting performance. Consequently, the number of lids 12 to be formed per rolled sheet 200 can be increased, and the material cost can be reduced. In addition, it is also possible in the fitting portion 32 to suppress thickness variations in the circumferential direction.

Moreover, the lid 12 is formed in such a shape that the drinking hole 41 is located at the peripheral portion side of the top portion 31 and the inner fitting portion 51 of the fitting portion 32 is continuous with the peripheral portion of the top portion 31. As such, the distance from the lower end of the inner fitting portion 51 to the drinking hole 41 can be set to be as small as possible, and therefore, the content can be discharged from the drinking hole 41 as completely as possible. This can minimize the amount of the content that cannot be discharged, and therefore, a leftover can be suppressed.

As described above, with the lid 12, the mold 112, and the method for manufacturing the lid 12 according to the embodiment, the upper fitting portion 52 of the fitting portion 32 for fitting onto the rim 21b of the container body 11 can be made thicker than the other portions of the lid 12. Therefore, the lid 12 can enhance the fitting performance of the fitting portion 32 with respect to the container body 11.

(Evaluation Test on Lid 12)

Next, a description will be given of a number of evaluation tests conducted through the use of the lids 12 formed as above, as well as the evaluation results. Note that the evaluation tests were intended to further embody the features of the present invention. The scope of the present invention is not limited to the examples set forth below.

[First Evaluation Test]

As the first evaluation test, three lids 12 were randomly picked from the multiple lids 12 according to the embodiment, which were manufactured with the mold 112 according to the embodiment and through the manufacturing method according to the embodiment. Then, thickness values of the fitting portion 32 of each of the three lids 12, i.e., thickness e of the inner fitting portion 51, thickness f of the lower arc portion 52b of the upper fitting portion 52, and thickness g of the concave portion 53 as indicated in FIG. 7, were measured. The respective average values of the thicknesses e, f, and g were obtained. Also, as set forth in FIG. 14, average values of the thicknesses of the conventional FM lids 12A, each having a top portion and a drinking hole above the fitting portion, for the portions corresponding to the respective thicknesses e, f, and g, were obtained based on three measurement cases and given as a comparative example for comparison.

Note that the FM lids 12A in the comparative example were the lids purchased at a store named "Family Mart".

As a measurement instrument, a microscope (VHX-6000 manufactured by KEYENCE) was employed, and each thickness was measured at a magnification of 50 times. Also, each of the thicknesses e, f, and g of the FM lids 12A in the comparative example was based on the information given by the manufacturer of the FM lids 12A.

[Results of First Evaluation Test]

Figures 14, 15:
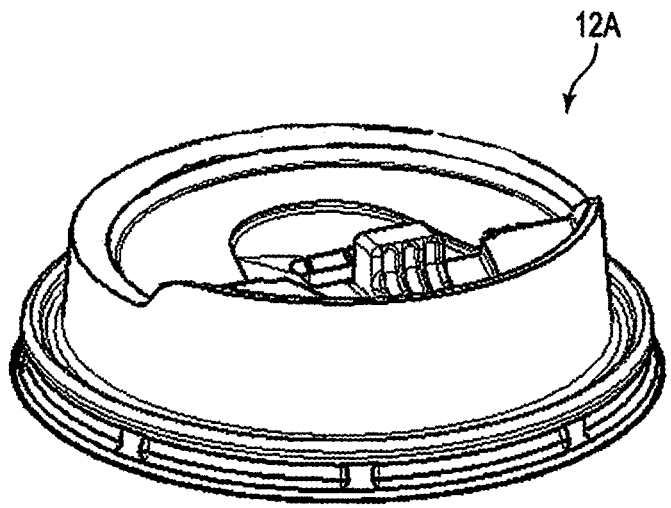
FIG. 14 is a perspective view showing a structure of a lid according to a comparative example.
FIG. 15 is an explanatory chart showing results of a first evaluation test on the lids.

As shown in FIG. 15, for the fitting portion 32 of the lid 12 according to the embodiment, all the measurement results from the three lids 12 showed that the thickness f of the lower arc portion 52b of the upper fitting portion 52 was larger than the thickness e of the inner fitting portion 51 and the thickness g of the concave portion 53. Also for the average values of the respective thicknesses e, f, and g based on the three lids 12, a similar result was obtained, with the average thicknesses f of 0.284 mm being the largest among the average thicknesses.

Note that, for the FM lids 12A as the comparative example, the thickness g of the portion corresponding to the concave portion was the largest, the thickness f of the portion corresponding to the lower arc portion 52b was the second largest, and the thickness e of the portion corresponding to the inner fitting portion 51 was the smallest. As such, in the results for the lid 12 according to the embodiment, the thickness f for the upper fitting portion 52 was the largest, unlike in the FM lids 12A in the comparative example.

It can be inferred from the results of the first evaluation test as above, and also from the method for manufacturing the lid 12, that the thickness of the upper fitting portion 52 except the concave portion 53 is larger than the thickness of the other portions of the fitting portion 32. It can also be inferred that the upper arc portion 52a of the upper fitting portion 52 has the same thickness as, or a larger thickness than, that of the lower arc portion 52b.

From the foregoing, the lid 12 according to the embodiment is observed to have an enhanced fitting performance of the fitting portion 32 with respect to the container body 11, compared to the FM lids 12A in the comparative example.

[Second Evaluation Test]

As the second evaluation test, leakage checks were conducted in which, as explained below, a test liquid was provided in a container 1 using the lid 12 according to the embodiment, and leakage of the test liquid from the container 1 was checked while the container 1 was placed in a predetermined posture using a tilting jig 400. The second evaluation test is a so-called "Montreal test". More specifically, a test liquid was first poured into the container body 11, and the lid 12 according to the embodiment was fitted onto the container body 11. Then, the container 1 containing the test liquid was held for 15 seconds in a state of being tilted at 45° with respect to the direction of gravity by the tilting jig 400 shown in FIG. 16. Subsequently, the number of droplets of the test liquid dripped from the container 1 during the 15 seconds was counted. This counting was performed ten times using different, respective container bodies 11 and lids 12.

Figures 16, 17:
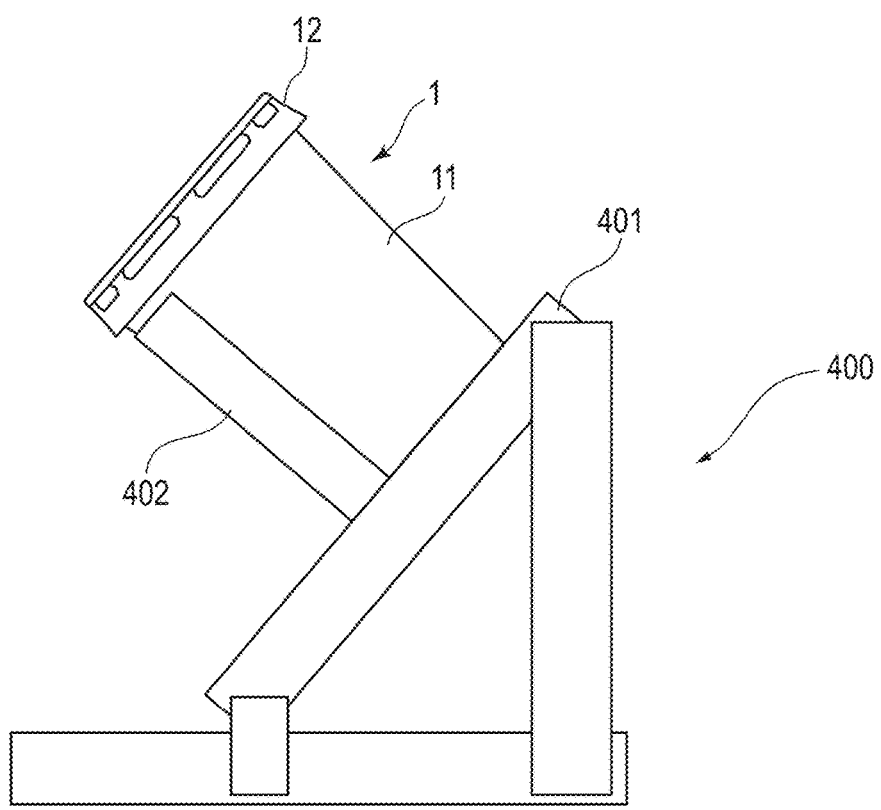
FIG. 16 is a side view showing a configuration of a tilting jig used for a second evaluation test on the lids.
FIG. 17 is an explanatory chart showing results of the second evaluation test on the lids.

The tilting jig 400 employed in the second evaluation test had a structure including, as shown in FIG. 16, a base 401 adapted to tilt at 45° with respect to the direction of gravity when the tilting jig 400 was installed, and a support plate 402 for supporting the container 1 placed in the 45° posture on the base 401.

As the test liquid, a solution prepared by stirring and dissolving a predetermined amount of powder coffee in hot water was used. The temperature of the test liquid was maintained at 90° C. to 95° C. Also, the amount of the test liquid was set to an amount at which, when each container body 11 was tilted at 45°, the test liquid reached the upper end (the rim 21b) of the container body 11.

As the container bodies 11 to which the respective lids 12 according to the embodiment were attached, GDNC09AR manufactured by DIXIE JAPAN LTD were used.

[Results of Second Evaluation Test]

FIG. 17 shows the results of the second evaluation test. In all of the 10 leakage checks, no droplets of the test liquid were observed. As evident from the results of the second evaluation test, it was confirmed that, with the fitting portion 32, the lid 12 according to the embodiment can secure sufficient fitting performance with respect to the container body 11 and realize good water-tightness.

[Third Evaluation Test]

As the third evaluation test, a test was conducted as explained below to evaluate an angle at which the content spilled from each of the container 1 using the lid 12 according to the embodiment, a container using the FM lid 12A according to the comparative example, the container body 11 adapted for attachment of the lid 12, and the container body 11 adapted for attachment of the FM lid 12A. Note that the lid 12 and the container body 11 for the embodiment here were the same as those used in the second evaluation test, and the FM lid 12A for the comparative example was the same as that used in the first evaluation test. As the container body 11 to which the FM lid 12A according to the comparative example was attached, GDNC09AR manufactured by DIXIE JAPAN LTD was used.

In the third evaluation test, the container or the container body was gradually tilted, from an angle of 20°, by 10° at a time, so as to check the angle at which a spilling of the test liquid was visually recognized.

Here, the container body 11 adapted for attachment of the lid 12 according to the embodiment was an 8-oz cup container, and the container body 11 adapted for attachment of the FM lid 12A according to the comparative example was a 9-oz cup container. Each container body was provided with the test liquid in an amount expected for sale, and the amount of the contained test liquid was measured. The test liquid was the same as that used in the second evaluation test.

[Results of Third Evaluation Test]

FIG. 18 shows the results of the third evaluation test. From the results of the third evaluation test, in the case of the container 1 using the lid 12 according to the embodiment, the test liquid spilled from the container 1 when tilted at 40°. This container 1 contained the liquid in an amount of 168 g.

Similarly, when the container body 11 adapted for attachment of the lid 12 was used alone and tilted, the test liquid spilled from the container body 11 when tilted at 40°. The container body 11 contained the liquid in an amount of 169 g. As evident from these results, the container 1 using the lid 12 allows for the drinking of the content at the same angle as the angle for drinking the content from the container body 11 alone. That is, it has been confirmed that the container 1 using the lid 12 can secure a comfort of drinking comparable with the case of drinking the content from a paper cup alone.

In the case of the container using the FM lid 12A according to the comparative example, the test liquid spilled from the container when tilted at 60°. However, when the container body adapted for attachment of the FM lid 12A was used alone and tilted, the test liquid spilled from the container body when tilted at 30°. As such, it has been confirmed that in the case of using a conventional lid having a drinking hole at a level higher than the fitting portion, e.g., the FM lid 12A according to the comparative example, the drinking of the content required a larger tilting angle than that in the case of a paper cup alone, and the usability of the conventional lid was different from that of the paper cup alone.

[Fourth Evaluation Test]

As the fourth evaluation test, a test liquid was put in each of the container 1 using the lid 12 according to the embodiment and the container using the FM lid 12A according to the comparative example, and the temperature of a site A for contacting the lower lip and the temperature of a site B for contacting the upper lip in each of the lid 12 and the FM lid 12A were measured while the lid 12 and the FM lid 12A were set at an angle that would cause a spilling of the test liquid. Comparison was made between the embodiment and the comparative example. Note that, for the container 1 using the lid 12 according to the embodiment, the site A was the skirt portion 33 and the site B was the inner fitting portion 51. For the container 1 using the FM lid 12A according to the comparative example, the site A and the site B were regions where the lower lip and the upper lip actually contacted when they were placed against the lips.

The test liquid was the same as that used in the second evaluation test.

[Results of Fourth Evaluation Test]

From the results of the fourth evaluation test as shown in FIG. 19, the temperatures of the lid 12 according to the embodiment were 38.2° C. at the site A and 36.7° C. at the site B, which were lower than the temperature of the test liquid, which ranged from 90° C. to 95° C. As can be understood from this, it has been confirmed that the lid 12 did not permit the content to adhere to the skirt portion 33 or the inner fitting portion 51 which would be touched by the lips, and therefore, the lid 12 was able to prevent thermal conduction from the content to the lips. It has been proven that the lid 12 can consequently prevent a burn on the lips. On the other hand, the temperatures of the FM lid 12A according to the comparative example were 75.9° C. at the site A and 68.8° C. at the site B, which were close to the temperature of the test liquid. Therefore, it has also been made apparent that the lid 12 according to the embodiment did not permit easy thermal conduction from the content to the lips, as compared to the FM lid 12A according to the comparative example.

[Fifth Evaluation Test]

As the fifth evaluation test, the time required for attaching the lid 12 according to the embodiment to the container body 11 and the time required for attaching the FM lid 12A according to the comparative example to the container body were measured to evaluate the ease of fitting of the lid 12.

Note that, as a manner of attaching the lid 12 to the container body 11 (how to fit the lid 12), it was stipulated that the left hand should be used to hold the container body 11 and the right hand should be used to attach the lid 12. FIG. 20 sets forth pictures of the fitting manners in the actual evaluation test. The evaluation was carried out by three participants consisting of a woman in her twenties, a man in his twenties, and a man in his thirties, who were all right-handed.

[Results of Fifth Evaluation Test]

From the results of the fifth evaluation test as shown in FIG. 20, the woman in her twenties took 1.26 seconds to attach the lid 12 according to the embodiment to the container body 11, whereas she took 12.08 seconds to attach the FM lid 12A according to the comparative example to the container body.

The man in his twenties took 2.59 seconds to attach the lid 12 according to the embodiment to the container body 11, whereas he took 4.96 seconds to attach the FM lid 12A according to the comparative example to the container body.

The man in his thirties took 1.93 seconds to attach the lid 12 according to the embodiment to the container body 11, whereas he took 3.91 seconds to attach the FM lid 12A according to the comparative example to the container body. In all of these results, the time required for attaching the lid 12 according to the embodiment to the container body 11 was shorter than that required for attaching the FM lid 12A according to the comparative example.

These results are attributable to the fact that the lid 12 according to the embodiment successfully allowed the fitting portion 32 to be fitted onto the rim 21b using a pressing by the palm of hand via the upper end of the fitting portion 32, whereas the FM lid 12A according to the comparative example required a pressing by the fingertip along its fitting portion since the palm pressing on the FM lid 12A pushed the top portion and hampered the appropriate pressing of the fitting portion.

Here, in the case of the woman in her twenties, when she tried to attach the FM lid 12A according to the comparative example to the container body, she deformed the fitting portion and could not couple it to the rim of the container body well. Due to this, more time was needed in the comparative example.

As is evident from these results, it has been proven that the lid 12 according to the embodiment can be quickly attached to the container body 11 with only a pressing by the palm of hand via the fitting portion 32, and therefore, the lid 12 is easily attachable. Moreover, since the time required for attachment could be reduced, the time required for holding the container body 11 could also be reduced. This has made it clear that the thermal conduction from the content to the hand can be prevented as much as possible, and accordingly, hands can be protected against heat.

Note that the present invention is not limited to the foregoing embodiments. The description has assumed an exemplary structure where the drinking hole 41 is opened and closed by the tab 42, but this is not a limitation. The lid 12 may be formed without the tab 42 or the tab receiver 43. In such a structure, the drinking hole 41 may be formed by a punching process during the formation of the lid 12. The lid 12 having such a structure does not need to have the small hole 44 since the drinking hole 41 is always open.

The description has also assumed an exemplary structure where the skirt portion 33 is formed in a tapered shape with its diameter increasing radially outwardly from the upper side toward the lower side, but this is not a limitation. The skirt portion 33 may be formed in a cylindrical shape with a constant diameter.

The description has also assumed an exemplary structure where the grooves 33a of the skirt portion 33 each have a shape extending along the direction which is orthogonal to the circumferential direction of the skirt portion 33 and in which the skirt portion 33 extends, but this is not a limitation. More specifically, the shape of each groove 33a is not limited to the foregoing shape as long as it can reinforce the skirt portion 33 and also permit the mold 112 to be easily released from the rolled sheet 200 formed into the shape of the lid 12 in the vacuum pressure molding, and instead of the grooves 33a, it may also be protrusions protruding from the outer circumferential surface of the skirt portion 33. That is, the skirt portion 33 serves the purpose when it at least has an uneven shape that can enhance the buckling strength. For example, the skirt portion 33 may have an uneven shape or shapes in a spiral pattern.

Moreover, the description has assumed an exemplary instance where the vacuum pressure molding is employed to form the lid 12, but this is not a limitation. For example, injection molding may be employed to form the lid 12. Note that the formation of the lid 12 by the injection molding may use a mold including cavities corresponding to the shape in which the thickness of the upper fitting portion 52 of the fitting portion 32 is larger than the thicknesses of the skirt portion 33 and the inner fitting portion 51.

The present invention is not limited to the foregoing embodiments. For practical implementation, various modifications may be adopted without departing from the gist of the invention. The various embodiments may be discretionarily combined for implementation, and such combinations will produce combined effects. Moreover, the embodiments involve various aspects, and appropriate combinations of the disclosed features will permit various inventions to be derived. For example, if omission of several features from the entire configuration or structure disclosed for the embodiments can realize the intended object and provide the effects, the configuration or structure after such omission may be derived as an invention.

The invention claimed is:

1. A lid comprising:
    a circular top portion including a drinking hole at a peripheral portion thereof, at least a portion of the top portion having the drinking hole having a flat shape;
    a fitting portion including an inner fitting portion and an upper fitting portion,
        the inner fitting portion protruding upwardly from a peripheral end of the top portion and adapted to contact a rim-side inner circumferential surface of a container body, the inner fitting portion having an outer diameter equal to an inner diameter of the rim-side inner circumferential surface of the container body and the inner fitting portion having a same inclination angle as that of the rim-side inner circumferential surface of the container body, such that, at least in a state where the inner fitting portion is attached to the container body, the inner fitting portion contacts with the rim-side inner circumferential surface of the container body,
        the upper fitting portion being thicker than the inner fitting portion and adapted to be fitted onto a rim of the container body,
        an upper end of the fitting portion being at a level higher than the drinking hole; and
    a skirt portion,
        an upper end of the skirt portion being continuous with an outer-side lower end of the fitting portion,
        the skirt portion extending downwardly away from the rim of the container body,
        the skirt portion has a tapered shape which increases in diameter in a radially outward direction from the upper end of the skirt portion to a lower end of the skirt portion; and
        the skirt portion being adapted to cover a rim-side outer circumferential surface of the container body;
    wherein the skirt portion has an uneven shape to enhance buckling strength; and
    a plurality of concave portions, separate from the uneven shape, are provided between the upper fitting portion and the skirt portion, with one of the plurality of concave portions overlapping the drinking hole in a radial direction of the circular top portion.

2. The lid according to claim 1, wherein the skirt portion is spaced apart from the outer circumferential surface of the container body.

3. The lid according to claim 1, wherein a height from a lower end to an upper end of a part of the inner fitting portion that contacts the inner circumferential surface of the container body is 3 mm to 10 mm.

4. The lid according to claim 2, wherein a height from a lower end to an upper end of a part of the inner fitting portion that contacts the inner circumferential surface of the container body is 3 mm to 10 mm.

5. The lid according to claim 1, wherein the uneven shape comprises a plurality of grooves each extending in a direction orthogonal to a circumferential direction of the skirt portion.

* * * * *